United States Patent [19]

Becker

[11] E Re. 30,642

[45] Reissued Jun. 9, 1981

[54] PROCESS FOR PREPARING MOLYBDENUM ACID SALTS

[75] Inventor: Mitchell Becker, Teaneck, N.J.

[73] Assignee: Halcon Research & Development Corp., New York, N.Y.

[21] Appl. No.: 114,772

[22] Filed: Jan. 23, 1980

Related U.S. Patent Documents

Reissue of:

[64] Patent No.: 3,578,690
Issued: May 11, 1971
Appl. No.: 740,975
Filed: Jun. 28, 1968

[51] Int. Cl.[3] ..... C08H 17/36
[52] U.S. Cl. ..... 260/414; 260/429 R
[58] Field of Search ..... 260/429 R, 414

[56] References Cited

U.S. PATENT DOCUMENTS

| | | | |
|---|---|---|---|
| 2,795,550 | 6/1957 | Harle | 252/49.7 |
| 3,046,287 | 7/1962 | Larson | 260/429 |
| 3,362,972 | 1/1968 | Kollar | 260/414 |
| 3,578,690 | 5/1971 | Becker | 260/414 |

FOREIGN PATENT DOCUMENTS 556797 8/1932 Fed. Rep. of Germany .

OTHER PUBLICATIONS

Yamate et al., "Chemistry of Fatty Acids", pp. 46–48, 6–10–67, and English Translation.

*Primary Examiner*—Helen M. S. Sneed
*Attorney, Agent, or Firm*—William C. Long; David Dick; Harold N. Wells

[57] ABSTRACT

This invention relates to the preparation of molybdenum acid salts by directly reacting the carboxylic acid with a molybdenum compound while removing the water that is formed. These molybdenum acid salts are useful as catalysts in such processes as in the epoxidation of olefins.

9 Claims, No Drawings

PROCESS FOR PREPARING MOLYBDENUM ACID SALTS

Matter enclosed in heavy brackets [ ] appears in the original patent but forms no part of this reissue specification; matter printed in italics indicates the additions made by reissue.

This invention relates to the preparation of molybdenum acid salts. More particularly it relates to a process for preparing Molybdenum salts of carboxylic acids by direct reaction of particular molybdenum compounds, with a mono carboxylic acid of from 2 to 35 carbons.

Various metal compounds including salts of molybdenum have been employed for use as catalysts in a variety of processes including the epoxidation of olefins such as propylene. In the preparation of molybdenum salts for such purposes various techniques have been uses, all of which are extremely diffucult and expensive, particularly for preparing hydrocarbon soluble compositions containing a high metal content. Up to this time, the art has not been able to directly prepare the molybdenum carboxylates of this invention and at the same time obtain a composition with a high metal content.

In one prior art method for preparing molybdenum salts of carboxylic acids, $MoO_3$ is reacted with oxalic acid in the presence of hexanoic acid, the carboxylic acid use for the eventual molybdenum carboxylate. This technique leads to the formation of molybdenum hexanoate, wherein the final composition of the molybdenum in hydrocarbon soluble form is approximately 5%. In this prior art process, it is critical to have oxalic acid in the system in order to obtain this 5% final composition. In still another prior art method, molybdenum carboxylates have been prepared by reacting molybdenum hexacarboxyl in the presence of an excess of a carboxylic acid, and the reaction mixture heated until evolution of gases ceases.

Each of these prior processes use expensive starting materials, form carboxylates with low metal content and/or require several steps for the process. The art is thus presented with the problem of finding a simple inexpensive method for preparing molybdenum carboxylates. In addition, in order to make these molybdenum carboxylates more attractive as catalysts, a soluble hydrocarbon composition is desirable which has a high molybdenum content. It is an object of this invention, therefore, to prepare molybdenum carboxylates by a direct inexpensive method. It is a further object to prepare molybdenum carboxylates which have a high metal content. Further objects will become apparent upon reading the specification.

In accordance with my invention, I have found that a molybdenum oxide, alkali or alkali earth molybdate, *or* ammonium molybdate [or a molybdenum halide] or a combination of the [molybdenum halides,] alkali, alkali earth or molybdenum oxides and ammonia, may be reacted directly, at elevated temperature, with the desired carboxylic acid while removing water, to form molybdenum carboxylate compositions containing high percentages of hydrocarbon soluble molybdenum. Accordingly, it is an advantage of my invention that the preparation of molybdenum carboxylates requires a simple heating step without any further processing and that the cost of manufacturing this catalyst does not materially differ from the raw material cost of the reactants. It is a further advantage that my process produce a molybdenum carboxylate composition of high molybdenum content. It is still a further advantage that these compositions can be prepared by employing commercially available relatively inexpensive molybdenum compounds.

Both molybdenum metal and molybdenum sulfide will not react directly with a carboxylic acid and, therefore, will not form molybdenum carboxylates. Further, none of the molybdenum compounds hereinabove mentioned will react with a carboxylic acid by merely directly heating one with the other. It was, therefore, unexpected to find that the before mentioned molybdenum compounds could be directly reacted with a carboxylic acid, while removing water, to form molybdenum carboxylate compounds.

DETAILS OF THE INVENTION

The process of this invention comprises the direct reacion of a molybdenum compound with a carboxylic acid at elevated temperatures, while removing the water from the reaction mixture, to form a molybdenum carboxylate. It is a critical feature of this invention that free water is removed during the reaction; this includes water that may be initially present and the water that is formed during the reaction.

The molybdenum compounds contemplated by this invention are [molybdenum halides such as molybdenum hexafluoride and molybdenum pentachloride,] the various oxides of molybdenum such as molybdenum dioxide, trioxide and sesquioxide, and the like; alkali and alkali earth molybdates such as cesium molybdate, sodium molybdate, potassium molybdate, calcium molybdate and the like; and ammonium molybdate or molybdic acid 85%, (the latter two are the same compound, however, the specification of molybdic acid 85% usually shows a slightly lower $MoO_3$ content). In the preferred aspect of this invention ammonium molybdate (molybdic acid 85%) and molybdenum trioxide are employed and especially ammonium molybdate.

The carboxylic acids contemplated by this invention are mono carboxylic acids, such as mono aliphatic acids, mono alicyclic acids, and mono aromatic acids. The aliphatic acids may be lower aliphatic acids of 2 to 6 carbon atoms such as acetic, propionic, butyric, isobutyric, valeric, caproic and the like; intermediate aliphatic acids of from 7 to 11 carbon atoms, such as heptanoic, octanoic, decanoic and the like; and higher aliphatic acids of from 12 to 30 carbons such as dodecanoic, hexadecanoic, docosanoic, tetracosanoic, tricosanoic and the like. The alicyclic acids may contain from 3 to 12 carbon atoms such as cyclopropionic, cyclohexanoic, cyclodecanoic, cyclododecanoic and the like. The aromatic acids may contain one or two fused rings and contain from 7 to 14 carbon atoms wherein the carboxyl group may or may not be attached to the ring; such as benzoic, 1 or 2 naphthoic, o, m-p-toluic, phenylacetic, 1 or 2 naphthalene acetic, phenylbutyric acid and the like. In the more preferred aspect of this invention, the carboxylic acid is a lower aliphatic acid, intermediate aliphaitc acid or a mono phenyl aromatic acid, and especially an intermediate aliphatic acid such as octanoic acid.

The starting molybdenum compound and carboxylic acid may be reacted in the presence of an inert solvent and in fact unless the carboxylic acid is a liquid at the temperature of reaction, a suitably inert solvent is employed. However, when employing the preferred carboxylic acids hereinbefore described, it is preferred to employ the carboxylic acid reactant as a solvent also.

As indicated previously, the removal of water is a critical feature of this invention. If the reaction is carried out without the removal of water, essentially no molybdenum compound is formed. However, although water removal is necessary, the manner in which it is removed is unimportant, and therefore, one may employ any known techniques for water removal. For example, the water may be removed by the use of dehydrating agents such as calcium chloride or more preferably one may employ an azeotropic agent. Any azeotrope may be used which would be inert to the reaction itself. The preferred azeotropes are benzene or aralkyl compounds such as lower alkyl benzenes containing from 1 to 3 alkyl groups and each alkyl group containing from 1 to 4 carbon atoms (ethylbenzene, xylene, cumene and the like) or any other straight or branched chain hydrocarbon such as an alkane of from 5 to 12 carbon atoms, (hexane, octane, decane and the like). In the preferred method of this invention, a lower alkyl benzene is employed such as ethylbenzene. If it is so desired, the azeotrope may also be used as a solvent in the system or if desired, the azeotropes may be used in addition to a solvent. The amount of azeotrope necessary depends upon the amount of water to be removed and will vary from one system to another and can be easily determined by one skilled in the art.

The reaction is suitably carried out at a temperature of from 100° C. to 300° C. In its preferred aspects, the reaction is carried out at a temperature of 150° C. to 250° C. and especially 190° C. to 225° C. It is to be understood that among other factors, the temperature of the reaction will depend upon the carboxylic acid employed, in that the temperature should be at or below the boiling point of the carboxylic acid at the pressure employed. Accordingly, the time of reaction is not critical and the reaction is carried out for a sufficient length of time to allow for substantial reaction to take place. Suitably, the reaction is carried out from 2 to 48 hours or more. The concentration of reactants, are not critical and accordingly may suitably be adjusted with regard to the specific reactants and conditions.

EXAMPLE 1

(a) A mixture consisting of 60 gm. octanoic acid, 17.7 gm. "molybdic acid, 85%," and 30 gm. ethylbenzene is charged to a 250 cc. flask equipped with a thermometer, reflux condenser and a Dean-Stark tube. This flask is then placed in a constant temperature oil bath which is kept at 200° C. The flask content is refluxed atmospherically for 48 hours, followed by filtration to remove any undissolved solids; yield 15.2 weight % molybdenum.

Similarly, when the above reaction is carried out at 100° C., 150° C., 250° C. or 300° C. until water is no longer evolved, similar results are obtained.

(b) Similarly, when an equivalent amount of molybdenum trioxide is used in place of molybdic acid in Example 1a above, there is obtained molybdenum octanoate; yield 3.4 weight % molybdenum.

Similarly, when an equivalent amount of [molybdenum hexafluoride, molybdenum pentachloride,] molybdenum dioxide, molybdenum sesquioxide, potassium molybdate or calcium molybdate is used in place of molybdenum trioxide, similar results are obtained.

When Example 1 above is carried out using an equivalent amount of molybdenum trioxide in place of molybdic acid and the reaction is carried out such that 1 liter of ammonia per hour is passed through the reaction, similar results are obtained.

Similarly, when the above reaction is carried out with octane, any xylene isomer or cumene in place of ethyl benzene, there is obtained similar results.

Similarly, when the above reaction is carried out with valeric acid, naphthenic acid, dodecanoic acid or cyclohexanoic acid in place of octanoic acid, there is obtained molybdenum valerate, molybdenum, naphthenate, molybdenum dodecanoate or molybdenum cyclohexanoate respectively.

When Example 1a is carried out using molybdenum metal or molybdenum sulfide in place of molybdic acid there is obtained an octanoate containing 0.04 or 0.2 weight % molybdenum respectively.

What is claimed is:

1. In a process for preparing a molybdenum carboxylate the improvement which comprises [intimately contacting] *directly reacting* a molybdenum oxide, [molybdenum halide,] alkali molybdate, alkali earth molybdate, ammonium molybdate, or a mixture of a molybdenum oxide, [molybdenum halide,] alkali molybdate or alkali earth molybdate and ammonia; with a monocarboxylic acid, at temperatures in the range of 100° to 300° C. while removing water.

2. In a process for preparing a molybdenum carboxylate the improvement which comprises the direct reaction of a molybdenum compound selected from the group consisting of a molybdenum oxide, [molybdenum halide,] alkali molybdate, alkali earth molybdate and ammonium molybdate; with a monocarboxylic acid, at temperatures in the range 100° to 300° C. while removing water.

3. In a process for preparing a molybdenum carboxylate the improvement which comprises directly reacting a molybdenum compound selected from the group consisting of molybdenum oxide, [molybdenum halide,] alkali molybdate, alkali earth molybdate and ammonium molybdate; with a monocarboxylic acid selected from the group consisting of mono aliphatic acid, mono alicyclic acid, and mono aromatic acid, at temperatures in the range 100° to 300° C. while removing water azeotropically.

4. The process of claim 3 wherein the molybdenum compound is selected from the group consisting of molybdenum trioxide and ammonium molybdate; the carboxylic acid is selected from the group consisting of a lower aliphatic acid, an intermediate aliphatic acid and a higher aliphatic acid[. The], *the* temperature is above 100° C. and the water is removed azeotropically with a compound selected from the group consisting of a lower alkyl benzene, and an alkane.

5. In a process for preparing molybdenum octanoate the improvement which comprises reacting ammonium molybdate with octanoic acid, at temperatures in the range 100° to 300° C. while removing water.

6. A process of claim 5 wherein, the temperature of reaction is 100° C. to 300° C., and the water is removed azeotropically.

7. A process of claim 6, wherein the temperature is between 150° and 250° C., and the water is removed azeotropically with a lower alkyl benzene or an alkane.

8. A process of claim 7, wherein the azeotrope is a lower alkyl benzene.

9. A process of claim 8, wherein the lower alkyl benzene is ethyl benzene.

* * * * *